United States Patent [19]
Parenti et al.

[11] Patent Number: 5,324,146
[45] Date of Patent: Jun. 28, 1994

[54] SPACECRAFT ASSEMBLY WITH MISALIGNMENT TOLERANT FASTENERS

[75] Inventors: Robert V. Parenti, Roebling, N.J.; Peter K. Homer, Newtown, Pa.; Eric Talley, Allentown, N.J.; John E. Close, East Windsor, N.J.; Joel DeStefano, Westampton, N.J.; Wensen Chen, Long Valley, N.J.

[73] Assignee: General Electric Co., East Windsor, N.J.

[21] Appl. No.: 948,270

[22] Filed: Sep. 21, 1992

[51] Int. Cl.$^5$ ............................................. F16B 41/00
[52] U.S. Cl. ................................. 411/82; 244/158 R
[58] Field of Search ............... 244/158 R, 131, 132, 244/117 R, 119; 411/82, 134

[56] References Cited

U.S. PATENT DOCUMENTS

| | | | |
|---|---|---|---|
| 2,235,078 | 3/1941 | Meisterhans | 411/82 |
| 2,405,925 | 8/1946 | Poupitch | 411/134 |
| 3,646,982 | 3/1972 | Cushman | 411/82 |
| 4,010,519 | 3/1977 | Worthing | 411/82 |
| 4,895,484 | 1/1990 | Wilcox | 411/82 |
| 4,932,805 | 6/1990 | Muller et al. | 411/82 |
| 5,145,330 | 9/1992 | Uchiyama | 417/363 |

Primary Examiner—Galen L. Barefoot
Attorney, Agent, or Firm—W. H. Meise; C. A. Berard; S. A. Young

[57] ABSTRACT

An apparatus and method for fastening together spacecraft panels includes the use of fastener pairs, one of which has preformed therein an aperture which is larger in diameter than the body of a tolerance takeup piece which is to pass therethrough. A washer which takes up the clearance is adhesively fastened to one of the fastener halves, and allowed to cure while the panels are in their desired position. Thus, a high-tolerance mating pair can be finalized in position at a late state in fabrication, without undesirable drilling or reaming. In a first particular embodiment, a flat washer, having an inside diameter which closely fits the corresponding bolt, is adhesively fastened over the preformed oversize aperture of a fitting. In another embodiment, the washer has an inside diameter which loosely fits the body of the bolt, but also includes a flange or dependent portion which extends through the joint, and which closely fits the inside diameter of the corresponding aperture in the other half of the fastener arrangement. In a yet further embodiment, the washer includes a two-step flange which takes up both axial and lateral tolerances.

4 Claims, 5 Drawing Sheets

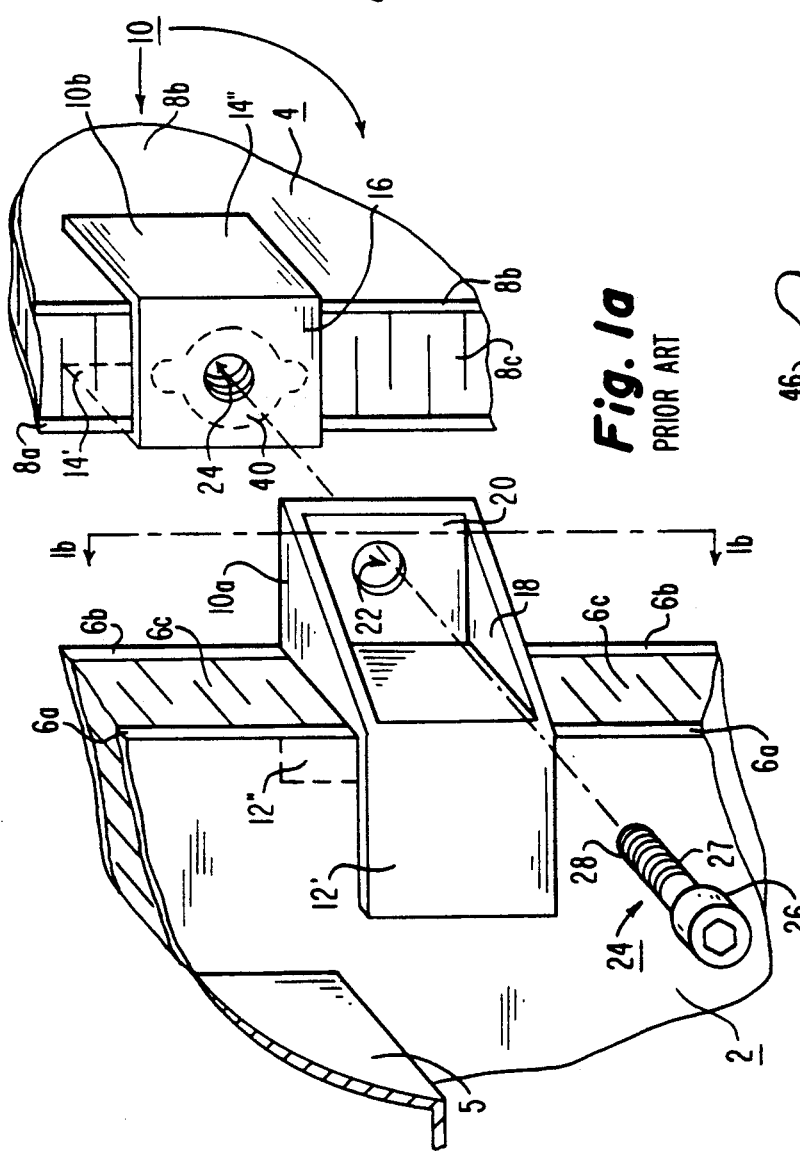
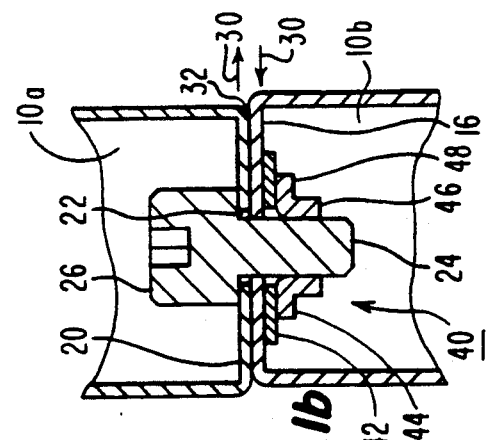
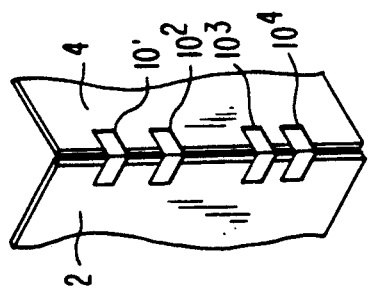
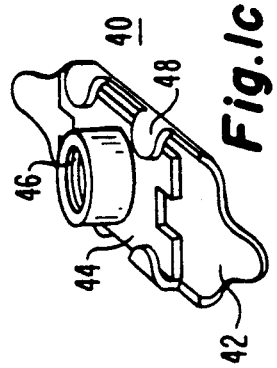

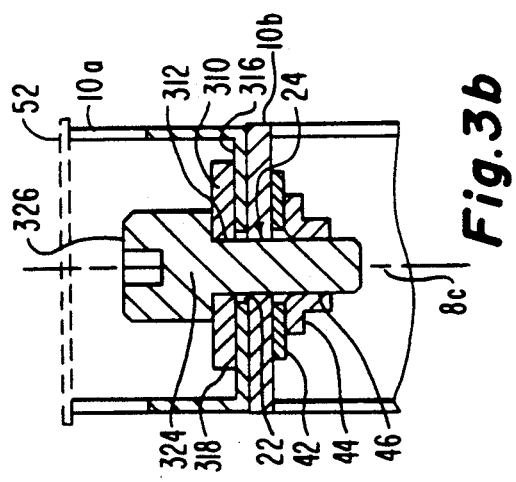
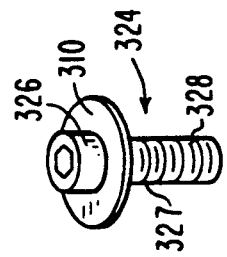
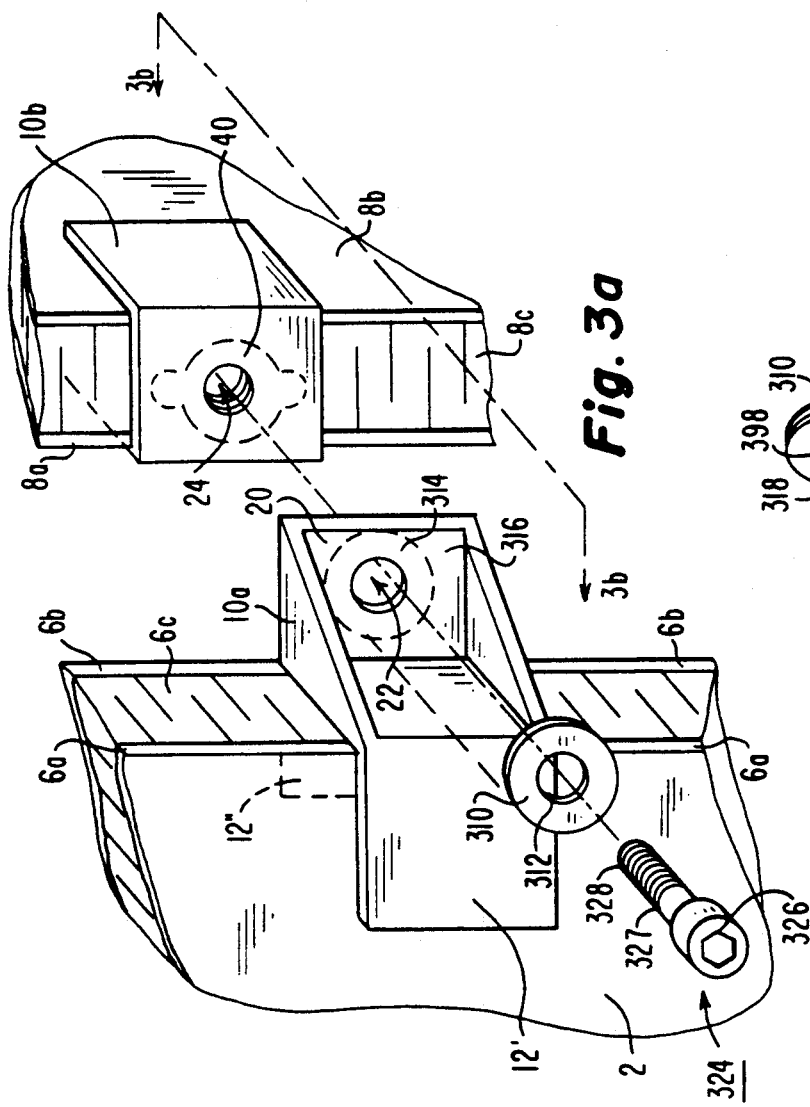
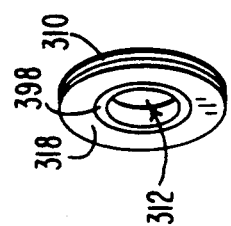

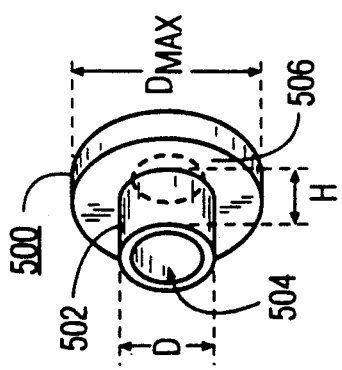
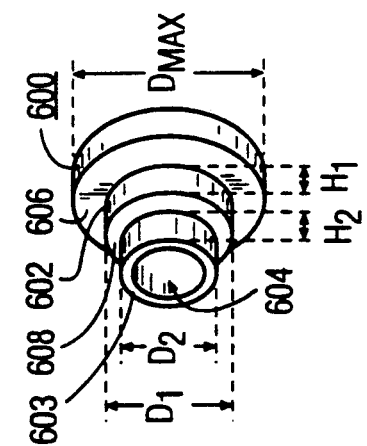
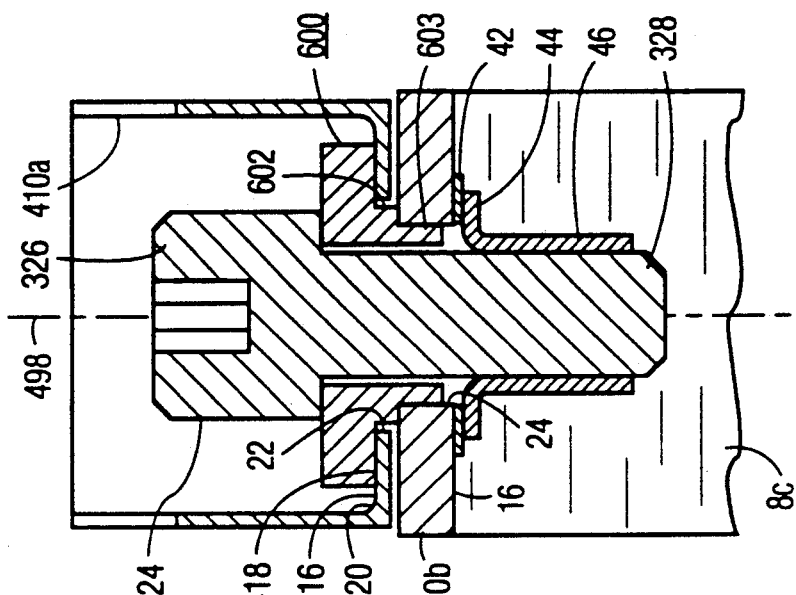
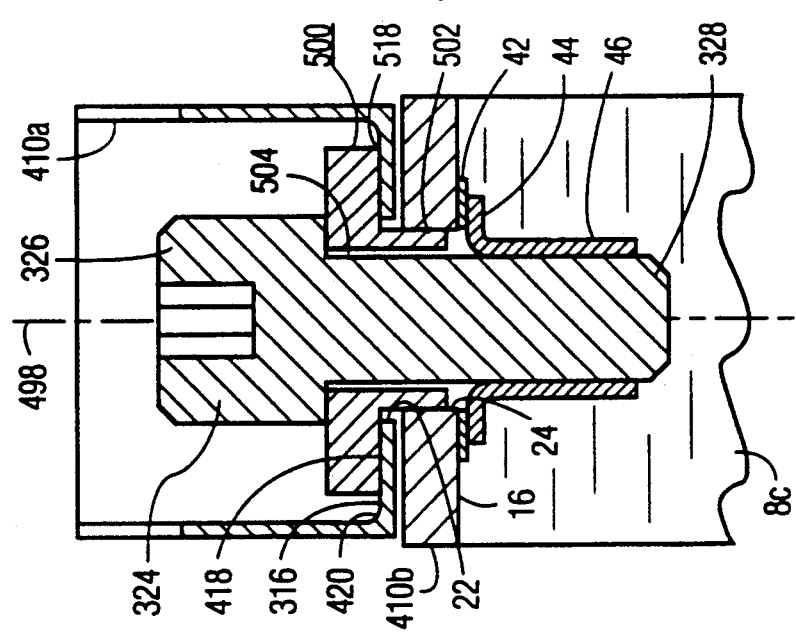

SPACECRAFT ASSEMBLY WITH MISALIGNMENT TOLERANT FASTENERS

BACKGROUND OF THE INVENTION

This invention relates to spacecraft fabricated from panels, and more particularly to fasteners and fastening methods which reduce the weight and cost of panel assembly.

The basic structural members of spacecraft currently include support panels in the form of relatively high-strength face sheets, spaced apart by a low-density core. As an example, such a panel might include a pair of parallel, spaced-apart aluminum sheets, with an aluminum honeycomb bonded therebetween. Such a panel exhibits high strength for its weight, and has advantageous thermal and electrical conduction characteristics. Other materials may be desirable, as for example the face sheets may be made from carbon-fiber reinforced resin.

Electrical and mechanical components and subassemblies are mounted on various panels of the spacecraft. Because of the high reliability required of a spacecraft, many tests are performed on the individual components, and on the subassemblies, at various stages of the manufacture. As part of assembly of a spacecraft, it is often necessary to fasten such a panel to another panel, either at the edges or at locations away from an edge. It might be possible to adhesively bond together the various panels of the spacecraft. However, adhesively bonded panels could not be disassembled for test or for access to other components for test. Consequently, removable fasteners are ordinarily used for holding together spacecraft panels, FIG. 1a illustrates a pair of panels 2, 4, and a portion of the housing 5 of a piece of electrical equipment mounted on panel 2, together with a prior art fastening technique. In FIG. 1a, panel 2 is formed from face sheets 6a and 6b, separated by a low-density core of honeycomb material 6c. Panel 4 includes face sheets 8a, 8b, and a similar honeycomb core 8c. Panels 2 and 4 are fastened together by a plurality of fastening arrangements $10^1$, $10^2$, $10^3$, $10^4$... as illustrated in FIG. 1d, only one of which, designated generally as 10, is illustrated in FIG. 1a. Fastening arrangement 10 includes a first clevis 10a, a second clevis 10b, and a bolt 24. Clevis 10a is associated with panel 2, and includes a furcated portion 12', 12'' and a connecting body portion Portions 12' and 12'' of clevis 10a straddle portions of the face sheets of panel 2, and are adhesively fastened thereto. Clevis 10b is associated with panel 4, and includes a furcated portion 14', 14'' which straddles across, and is adhesively fastened to a portion of face sheets 8a and 8b. Clevis 10b includes a flat body portion 16, which has a close-fitting clearance hole 24 for the body portion 27 of bolt 24, and which is fitted with a threaded captivated floating nut fastener 40, described below in conjunction with FIG. 1c. Body 18 of clevis 10a holds furcated portions 12', 12'' in mutually parallel relationship, and supports a flat base or bracket 20 which defines an aperture 22.

Bolt 24 of FIG. 1a includes a head portion 26 and a threaded end portion 28, with a body portion 27 lying therebetween. Bolt 24 extends through aperture 22 in clevis 10b, and its threaded end 28 screws into a floating nut 46, described below is conjunction with FIG. 1c. When bolt 24 is tightened into its nut, the head 26 of bolt 24 bears against a portion of bracket 20, and the adjoining faces of bracket 20 and the body portion of clevis 10b abut along a plane 32, visible in the cross-section of FIG. 1b.

A floating nut assembly designated 40 is fastened behind aperture 24 in FIG. 1a. The nut 48 must float, so that any slight misalignment between the nut and aperture 24 may be taken up during assembly. FIG. 1c is a perspective view of floating nut assembly 40. As illustrated, floating nut assembly 40 includes a base portion with bent-over lugs 48, which captivate a one-piece nut portion including a base portion 44 and a projecting threaded portion 46. The piece represented by base 44 and threaded portion 46 is free to move slightly relative to base 42. The floating nuts have locking features (deformed threads) which prevent loosening of the bolt, but which allow for repeated disassembly and reassembly.

During assembly, the panels are clamped in their desired relative positions, which are illustrated in FIG. 1d. If the clevises have not already been placed in position, they are so placed and adhesively fastened. If holes 22 in clevis 10a and 24 in clevis 10b have been preformed in the clevises before assembly, it is likely that the holes 22, 24 in fastener pairs will not properly align, unless some cutting or adjustment is made during the clevis adhesive fastening process. When there are many such fasteners associated with a pair of panels, it may be possible to adjust one or two fasteners so that holes 22 and 24 are coaxial, but the remainder are unlikely to align exactly.

In order to avoid the cost of hand-crafting the connection of each clevis to its associated panel, aperture 22 may be predefined in bracket 20 of clevis 10a with a diameter greater than the body diameter of bolt 24. The oversize of aperture 22 must be sufficient to accommodate the maximum expected tolerance error, to avoid the necessity for a reaming operation to enlarge the aperture. Reaming is undesirable, because the panel assembly normally takes place after equipment, such as the equipment represented by housing portion 5 of FIG. 1a, has been fastened to the panels and tested. A reaming operation generates chips and debris which could lodge within electronic components, or on surfaces to which further devices are to be fastened or which are intended for relative motion, thereby creating the possibility of electrical short circuits, mechanical interference, or both.

FIG. 1b is a cross-section of the assembled joint of FIG. 1a. Elements of FIG. 1b corresponding to those of FIG. 1a are designated by like reference numerals. As illustrated in FIG. 1b, the edges of aperture 22 do not bear against the body of bolt 24. The edges of aperture 24, however, do bear against the body of bolt 24. In order to prevent relative motion between the panels at fastener arrangement 10, bolt 24 is tightened into floating nut 46 sufficiently so that, in the presence of shear forces, friction between flat body portions 16 and 20 prevents motion. In FIG. 1b, the shear forces are represented by arrows 30. A useful rule of thumb for materials of the type used in spacecraft is that the normal forces holding together fastener halves 10a and 10b at an interface surface 32 must be about three times the expected shear force. Therefore, in order to withstand a shear force of, for example, 800 pounds force (1 bf), the normal force exerted by screw 24 must be on the order of 2400 lbs. In a particular such application, it is expected that, even using high-strength titanium fasteners, ⅜-inch bolts are required so as not to exceed their tensile limits. The relatively large number of bolts of such relatively large size represents a significant weight on the spacecraft. Also, the relatively large normal forces required, as described above, mandates a thicker cross-section for bracket 20 and body 16 of clevises 10a and 10b, respectively, all of which undesirably adds weight to the spacecraft.

FIG. 2a illustrates a prior-art arrangement for connecting the edge of a panel to a location away from the edge of a second panel. Elements of FIGS. 2c and 2b corresponding to those of FIGS. 1a and 1b are designated by like reference numerals. In FIGS. 2a and 2b, clevis 10b and panel 4 are identical to those of FIGS. 1a and 1b. Panel 2, however, is fitted with a "well" fastener designated generally as 50, which is in the general form of a cup, including a projecting lip 52, a body portion 54, and a bottom portion 56 defining an oversize aperture 22. The depth of body 54 is selected so the well fastener bottom is flush with the reverse side (not visible in FIG. 2a) of panel 2 when projecting lip 52 is flush with face sheet 6a of panel 2. The correspondence of well fastener 50 to clevis 10a is clear, and its cross-section is very similar to that of FIG. 1b. The arrangement of FIG. 2a suffers from the same problems as those of the edge fastener of FIGS. 1a, 1b and 1c.

If aperture 22 could be made to closely fit about the body of bolt 24 in FIGS. 1a or 2a, shear forces could be carried in a "body bound" fashion from the edges of aperture 22 directly to the body of bolt 24, and thence directly to the edges of hole 24. With such an arrangement, shear forces would be coupled directly from one clevis to the other clevis through the body of bolt 24, and motion would be prevented without reliance upon friction at the junction. As a result, large normal forces would not be required, the tensile stresses in the bolt could be reduced, and smaller bolts could therefore be used, together with a reduction in the cross-sectional dimensions of the associated portions of the clevises. An overall weight reduction would result. Such body bound construction is known in industries such as the aircraft industries. The body bound construction is accomplished in the aircraft industry by, with the structures being clamped in their desired positions, drilling apertures, corresponding to apertures 22 and 24, simultaneously. This results in lightweight, accurate fabrication, but at the expense of "crafting" each fastener, and also at the cost of undesirably producing debris and chips at a late stage in fabrication. Improved fastening methods are desired.

SUMMARY OF THE INVENTION

An apparatus and method for fastening together spacecraft panels includes the use of fastener pairs, one of which has preformed therein an aperture which is larger in diameter than the body of a tolerance takeup piece which is to pass therethrough. A washer which takes up the clearance is adhesively fastened to one of the fastener halves, and allowed to cure while the panels are in their desired position. Thus, a high-tolerance mating pair can be finalized in position at a late state in fabrication, without undesirable drilling or reaming. In a first particular embodiment, a flat washer, having an inside diameter which closely fits the corresponding bolt, is adhesively fastened over the preformed oversize aperture of a fitting. In another embodiment, the washer has an inside diameter which loosely fits the body of the bolt, but also includes a flange or dependent portion which extends through the joint, and which closely fits the inside diameter of the corresponding aperture in the other half of the fastener arrangement. In a yet further embodiment, the washer includes a two-step flange which takes up both axial and lateral tolerances.

DESCRIPTION OF THE DRAWING

FIG. 1a is an exploded view, in perspective or isometric form, of two panels of a spacecraft structure, held together at their edges by a fastening arrangement including a pair of clevises and a bolt, FIG. 1b is a cross-section of the structure of FIG. 1a in its assembled form, FIG. 1c is a perspective or isometric view of a floating nut assembly which may be used with the arrangement of FIG. 1a, and FIG. 1d illustrates a plurality of such fasteners along the edges of a pair of panels;

FIG. 3a is an exploded view, in perspective or isometric form, of portions of two panels of a spacecraft structure, held together at their edges by a fastening arrangement according to the invention, including a flat washer to which an adhesive is applied during a stage of manufacture, FIG. 3b is a section of the assembled joint taken along section lines 3b—3b, FIG. 3c illustrates a washer of FIG. 3a with an adhesive applied to one side thereof, and FIG. 3d illustrates the bolt extending through the washer of FIGS. 3a, 3b, and 3c.

FIG. 4d illustrates a bolt extending through the stepped washer of FIG. 4a;

FIGS. 5a and 6a are cross-sections of embodiments of fasteners in which the washer includes a body-bound portion, and FIGS. 5b and 6b are perspective or isometric views of the corresponding washers.

DESCRIPTION OF THE INVENTION

Figure 2B:
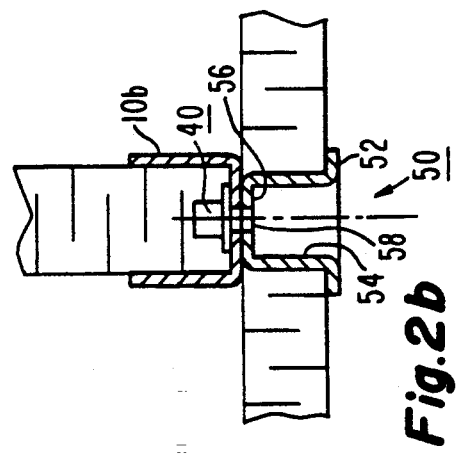
FIG. 2b is a cross-section of the joint in its assembled form.

FIGS. 3a, 3b and 3c illustrate one joint of a plurality of like joints holding together a pair of spacecraft panels, in accordance with an aspect of the invention. In FIGS. 3a and 3b, elements corresponding to those of FIG. 1a and 1b are designated by like reference numerals. In FIGS. 3a and 3b, the bolt is designated 324 rather than 24, with head 326, body 327 and threaded end 328, to emphasize that when the joint is prepared according to the invention, the bolt may be smaller than the one required in the prior art arrangement of FIGS. 1a and 1b. In FIGS. 3a and 3b, aperture 22 through bracket 20 of clevis 10a is larger than the diameter of the body of bolt 324, and aperture 24 in clevis 10b is a close fit, as in the prior art. Naturally, the floating nut (assembly 40 visible in outline in FIG. 2c) is dimensioned and threaded to engage threaded bolt end 328.

In accordance with an aspect of the invention, a flat washer 310 is interposed between the head 326 of bolt 324 and base or bracket 20 of clevis 10a, as illustrated in FIGS. 3a and 3b. Washer 310 has a central aperture 312, the diameter of which is a close fit about the body of bolt 324. The outer diameter of washer 310 is larger than the diameter of aperture 22 in bracket 20, and somewhat smaller than the dimensions of a flat portion 316 of bracket 20, as illustrated by dotted outline 314 of washer 310. These dimensions allow washer 310 to be slipped onto bolt 324 during initial assembly as illustrated in FIG. 3d, in which body 327 and threaded end 328 of bolt 324 depend from washer 310. The threaded end 328 and body 327 of bolt 324 are then passed through apertures 22 and 24, and the threaded end 328 is then screwed into floating nut 46. The illustrated phantom position 314 of washer 310 in FIG. 3a is the ideal position centered on aperture 22, which is taken when no tolerance build-up has occurred. The position of washer 310 is expected to be offset within flat portion 316 of bracket 20 under most conditions.

According to a further aspect of the invention, the panels are initially held together by a plurality of fastening arrangements such as that described in conjunction with FIGS. 3a and 3b. With the panels of FIGS. 3a and 3b held in position as described above, a bolt 324 and its washer 310 are then removed from each joint in turn, adhesive is applied to the interface between washer 310 and base 20 of clevis 10a, and the bolt and washer are again tightened into position. the adhesive is allowed to cure, with the fastening arrangements in place. Following the adhesive cure, washer 310 becomes an integral part of clevis 10a. The washer's inside diameter, which is smaller than the inside diameter of aperture 22, closely fits the body of bolt 324, and is exactly aligned with close-fitting aperture 24 in clevis 10b. The two panels are thus disassemblably assembled, without drilling or reaming, each clevis has an aperture which closely fits its bolt, and the corresponding apertures 24, 312 of each fastener portion are in exact alignment notwithstanding dimensional errors deviations from the nominal straight condition, warp misplacement of the clevises on the panels, and the like.

FIG. 3c illustrates washer 310 of FIGS. 3a and 3b, with an adhesive layer 318 applied to a surface thereof prior to assembly. As illustrated, adhesive layer 318 is applied to an annular region toward the outer edge of the washer, leaving a region 398 about central aperture 312 clear of adhesive, to prevent adhesive from getting on the threads of the bolt during assembly. The layer of adhesive could be applied to bracket 20 of clevis 10a instead of the washer, or it could be applied to both surfaces. A suitable adhesive is type 9309 high strength epoxy, manufactured by Hysol, 2850 Willow Pass Rd., Pittsburg, Calif. 94565-3299. The material of washer 310 may be aluminum.

As mentioned above, after cure of the adhesive described in conjunction with FIGS. 3a, 3b and 3c, the clevises each have exactly aligned apertures which closely fit the body of the bolto. Large normal forces on the joint are not needed to provide sufficient friction to transfer shear forces, since shear forces are primarily transferred by the bearing of the washer and clevis aperture walls on the shaft of the bolt, so the bolts may be smaller than those required for a prior art assembly. In a particular application, it was found to be possible to use 0.190 inch diameter screws or bolts instead of 0.250 inch diameter screws or bolts. This reduction of screw size, with commensurate reductions in the thickness and weight of the associated clevis, achieves an overall weight reduction for the satellite. Such weight reductions, as known, are of extreme importance in satellite fabrication and operation.

Figure 2A:
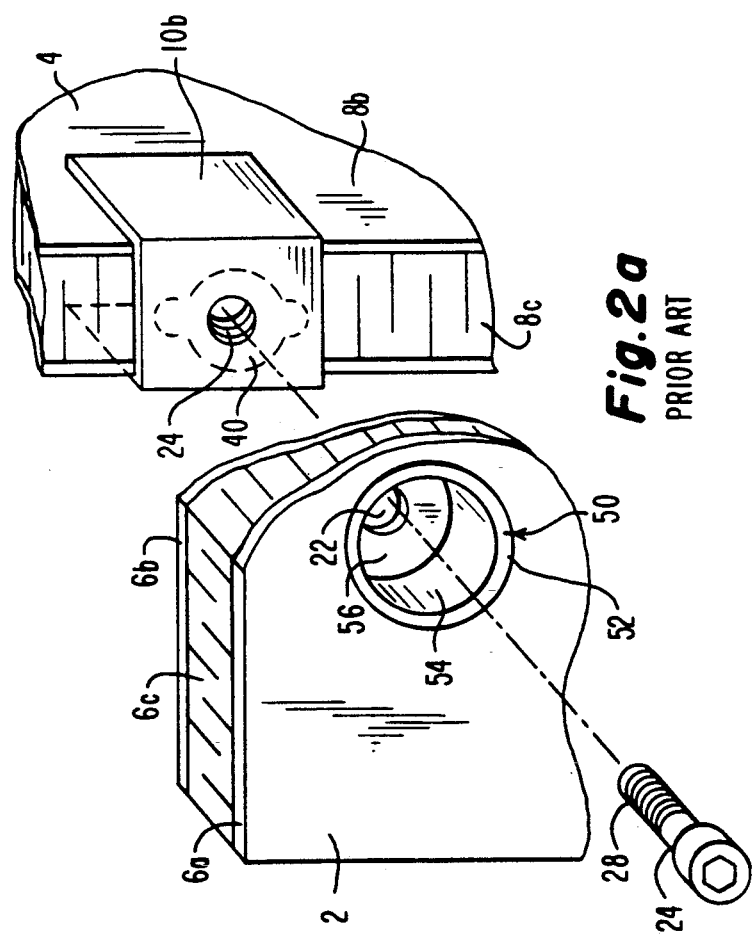
FIG. 2a is an exploded view, in perspective or isometric form, of the edge of a panel butted to the side of another panel, and held together by a fastening arrangement including a well fastener, a clevis and a bolt.

While FIGS. 3a and 3b have referred specifically to connection of edge panels by means of a pair of clevises, the description could as easily be applied to a butting connection of a panel edge to the body of another panel, using a clevis affixed to the edge, and a well connector, such as that described in conjunction with FIGS. 2a and 2b, affixed to the body. This interpretation is rendered apparent by considering clevis 10a of FIG. 3b to be well fastener 50 of FIG. 2c, with its lip 52 illustrated by dash lines in FIG. 3b.

It is also apparent to those skilled in the art that the use of bonded washers as described herein could be used in the joining of other types of objects, such as flat plates or fittings, where it is desirable to have closely aligned, close tolerance holes without drilling at assembly and without expensive matched tooling.

Figure 4C:
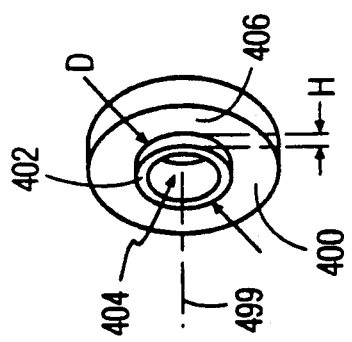
FIG. 4c is a perspective or isometric view of the stepped washer of FIGS. 4a and 4b.
Figure 4D:
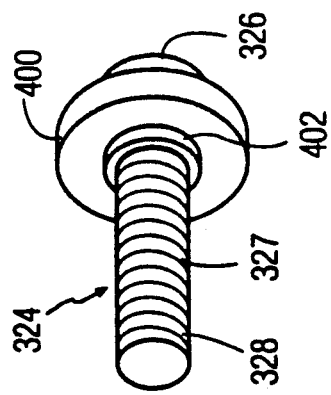
Figure 4B:
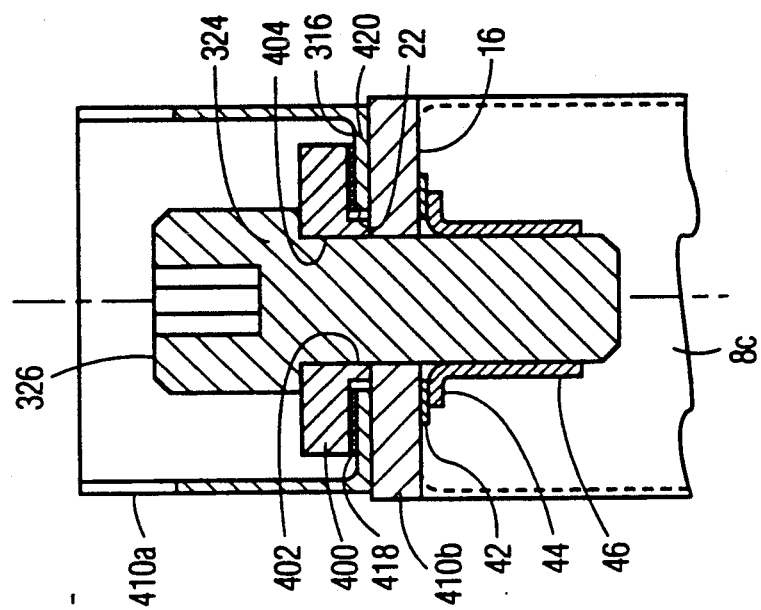
FIG. 4b is the same with another possible relative position of the fastener halves.
Figure 4A:
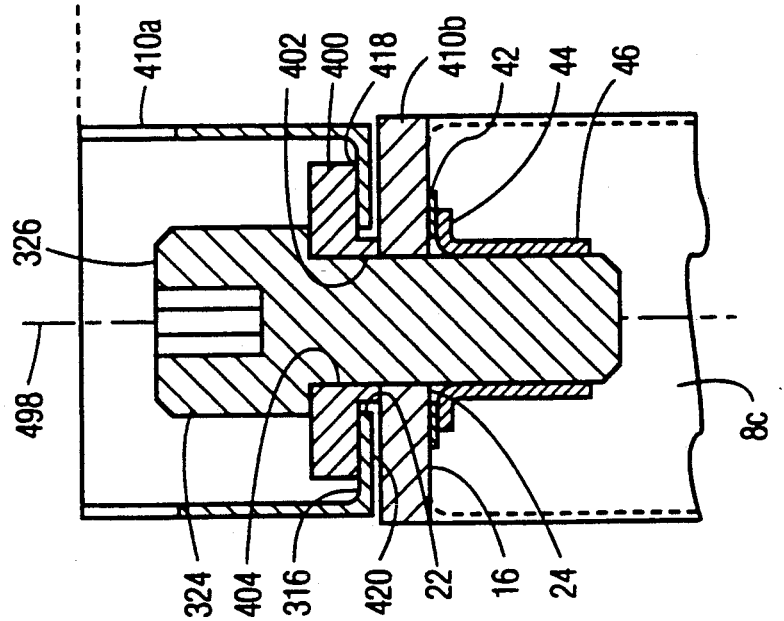
FIG. 4a is a cross-section of two fastener halves according to the invention, including an adhesively affixed step washer which takes up tolerance, showing a first possible position of the fastener halves.

As so far described, the tolerances taken up are those lying in a plane parallel to flat surface 316 of FIG. 3a. However, tolerances may also tend to space clevis 10a at varying distances from clevis 10b. The embodiment of FIG. 4a, seen in assembled cross-section, is similar to FIG. 3b, and corresponding elements are designated by like reference numerals. Since the fastener halves may, as mentioned, be either clevises or well-type fasteners, the halves are generically designated 410a and 410b. In FIGS. 4a, 4b and 4c, a washer 400 includes a central aperture 404 and a protruding flange 402. Center aperture 404 of washer 400 is a close fit to the body of bolt 324. The height H of flange 402 of washer 400, parallel to washer axis 499, is selected to exceed the thickness of bracket portion 420 of fitting half 410a in flat region 316, so that some play parallel to axis 498 of the bolt is allowed before the washer is adhesively affixed. FIGS. 4c and 4b illustrate two different positions of fastener half 410a relative to 410b. In particular, fastener half 410a assumes its extreme maximum height in FIG. 4a, with its flat surface 316 flush against the bottom of the main body of washer 400, spaced away from body 16 of fitting half 410b, and centered transversely so that flange 402 does not contact either side of aperture 22. The adhesive bond of washer 400 is indicated as 418. By contrast, FIG. 4b illustrates fastener half 410a in its lowest, rightmost position, with flat surface 316 spaced away from washer 400 and in contact with the upper surface of body 16 of fastener half 410b, and with adhesive material 424 filling the space between washer 400 and flat portion 316 of fastener half 410a. Also in FIG. 4b, with fastener half 410a in its rightmost position, its oversize aperture 22 has an edge which butts against the outer diameter of washer flange 402 at the left of the FIGURE, and which leaves a space between the edge of aperture 22 and the outer diameter of flange 402 at the right of the FIGURE.

The adhesive fastening of washer 400 to fastener half 410a is performed as described in conjunction with FIGS. 3a, 3b and 3c, except that washer flange 402 protects the bolt threads from a layer of adhesive applied to annular surface 406 of washer 400. More particularly, the panels, with fastener halves preattached at their nominal locations, are placed or clamped in the desired position, with large apertures 22 roughly aligned with body-size apertures 24. A flanged washer 400 is placed on each bolt, with flange portion 402 and the body and threaded end portions dependent, and the threaded end of each bolt is passed through its respective apertures 22 and 24, and screwed into a captive floating nut 46. This holds the panels in their final relative positions. The bolts and washers are then removed one at a time, adhesive is placed on that surface of washer 400 lying adjacent to flange 402, and the bolt and washer are replaced in the fastener and tightened. Thus, each fastener has its washer adhesively affixed with the panels and fastener halves in their final positions. After the adhesive cures, the bolts may be repeatedly removed and replaced for disassembly and reassembly of the panel joint.

The flanged washer of FIGS. 4a, 4b and 4c provides for transfer of shear forces from fastener half 410a to washer 400, and through the body of bolt 324 to fastener half 410b. Forces in the axial direction are transferred between fastener halves 410a and 410b by way of washer flange 402 and adhesive joint 424.

FIG. 5a is a cross-section of a panel joint according to another embodiment of the invention. elements of FIG. 5a corresponding to those of FIG. 4a are designated by like reference numerals. In FIG. 5a, the shear forces are transferred between fastener halves 410a and 410b by means of a body bound dependent portion of a stepped washer 500. In FIG. 5a, both apertures 22 and 24 in fastener halves 410a and 410b are larger in diameter than the body diameter of bolt 324. The diameter of aperture 22 is larger than that of aperture 24, and smaller than the largest diameter $D_{MAX}$ of washer 500. The outer diameter D of shoulder 502 of washer 500 is selected to closely fit the inside diameter of aperture 24 in fastener half 410b. The central aperture of washer 500 is a loose or clearance fit for the body diameter of bolt 324. Shoulder 502 height H is selected to project well into aperture 24.

The assembly sequence of the spacecraft represented by FIGS. 5a and 5b includes assembling equipment (not illustrated) onto at least one of the panels to be joined, testing the equipment, and affixing fastener halves 410a and 410b to their nominal locations on the two panels. The panels are juxtaposed in their desired positions. With the panels held in position, the shoulder 502 portion of a washer is inserted through aperture 24 and into aperture 22 of each fastener, following which the threaded end 328 of a bolt 324 is passed through the central aperture 504 of washer 500, and screwed into nut 46. After all the fasteners associated with the joint being assembled are temporarily fastened in this fashion, one fastener at a time has its bolt 324 and washer 500 removed, adhesive 518 is applied to washer surface 506, and the joint is reassembled. The adhesive is cured, after which the panel joint may be assembled and disassembled at will by simply removing the bolts.

The advantage of the arrangement of FIGS. 5a and 5b is that the washer is permanently affixed to one half of the fastener, and body bound in the other half. The bolt fits loosely. Shear forces between fastener halves thus pass through the washer and not through the bolt. The bolt may therefore be made from a lightweight material, or may be made smaller than in FIGS. 4a through 4d, and allow looser tolerances so as to be less expensive to procure.

The embodiment of FIG. 6a is similar to that of FIG. 5a in that shear forces are carried through the washer and not through the bolt, and is also similar to FIG. 4a in that axial forces are carried through a flange of the washer, so that misalignments in the direction of axis 498 can be accommodated. In FIG. 6a, elements corresponding to those of FIG. 5a are designated by like reference numerals. FIG. 6a differs from FIG. 5 in that its washer 600 has two steps rather than one. The total height of washer steps 602 and 603 in FIG. 6b is H1 and H2, respectively, and the sum of heights H1 and H2 is about equal to the height H of step 602 of the washer of FIGS. 5a and 5b. Washer 600 of FIGS. 6a and 6b includes an adhesive receiving surface 606 which bears on flat surface 316 of bracket 420 of fastener half 410a, and an axial force transferring surface 608 which bears on the upper surface of base 16 of fastener half 410b. The thickness of adhesive layer 418 between washer surface 606 and the flat portion 316 of bracket 420 allows for some axial mispositioning of the bracket halves, as described in conjunction with FIG. 4b. The assembly and disassembly procedure for the arrangement of FIG. 6a corresponds to that described for the arrangement of FIG. 5a, except, of course, that washer 600 is used instead of washer 500.

Other embodiments of the invention will be apparent to those skilled in the art. For example, the low-density core of a panel may be a foamed material rather than a honeycomb, or the objects to be joined may be flat plates or flanges with apertures so described rather than clevises, or a combination of flanges and well fittings are described (as, for example, when attaching a highly-loaded piece of equipment with mounting flanges to corresponding well fittings on the panel). In other words, the use of bonded washers in the current invention is not limited to the joining of honeycomb panels, but is generally applicable to removably joining any two objects where it is desirable to carry loads through bearing, and without machining or "crafting" of the connections. Moreover, the use of bonded washers in joining objects as described is not limited to the fabrication of spacecraft, but could be applied to almost any structural connection.

What is claimed is:

1. A method for assembling first and second objects in a manner permitting disassembly, comprising the steps of:

securing to said first object a first half of a fastener including a flat bearing portion defining a first aperture having a first diameter;

securing to said second object a second half of said fastener, including a flat bearing portion defining a second aperture having a second diameter larger than said first diameter;

adjusting to said first and second objects to a desired position in which said bearing portions of said first and second fastener halves are juxtaposed;

selecting a stepped washer including a bore, a major portion defining a first outer diameter and a dependent portions defining a second outer diameter, and in which said first outer diameter is greater than said second diameter and said second outer diameter is less than said second diameter of said second aperture;

placing said stepped washer over said second aperture with said dependent portion extending therethrough and through said first aperture;

with said first and second objects in said desired position, adhesively affixing said major portion of said stepped washer to a peripheral region about second aperture; and tightening said fastener by tightening a nut onto a threaded portion of a bolt extending through said bore of said stepped washer.

2. A method according to claim 1, wherein:

said step of selecting a stepped washer includes the step of selecting said stepped washer with said second outer diameter of said dependent portion greater than said first diameter of said first aperture, whereby said dependent portion bears against said flat bearing portion of said first half of said fastener in said placing step; and wherein said step of tightening comprises the step of selecting said bolt with a body diameter which closely fits the diameter of said bore of said stepped washer and said first diameter of said first aperture, whereby said adhesively affixing step results in compensating for tolerances in three dimensions, and said bolt withstands shear forces applied to juxtaposed flat bearing portions of said first and second halves of said fastener.

3. A method according to claim 1, wherein:

said step of selecting a stepped washer includes the step of selecting said stepped washer with said second outer diameter of said dependent portion to closely fit said first diameter of said first aperture; and wherein said step of tightening comprises the step of selecting said bolt with a body diameter which loosely fits the diameter of said bore of said stepped washer, whereby said dependent portion of said stepped washer withstands shear forces applied to the juxtaposed flat bearing portions of said first and second halves of said fastener.

4. A method according to claim 1, wherein:

said step of selecting a stepped washer includes the step of selecting said stepped washer as a double-step washer including a second dependent portion defining a third outer diameter, and in which said second diameter of said first-mentioned dependent portion is greater than said first diameter of said first aperture, whereby said stepped washer bears on said first bearing surface of said first half of said fastener, and in which said third diameter of said second dependent portion of said stepped washer closely fits within said first diameter of said first aperture, whereby said second dependent portion of said stepped washer withstands shear forces applied to said juxtaposed flat bearing portions of said first and second halves of said fastener.

* * * * *